July 7, 1970  N. J. PETERS  3,518,759
ATTEMPERING AND FINISHING UNIT FOR CULTURED SOUR CREAM
Filed Oct. 1, 1965  2 Sheets-Sheet 1
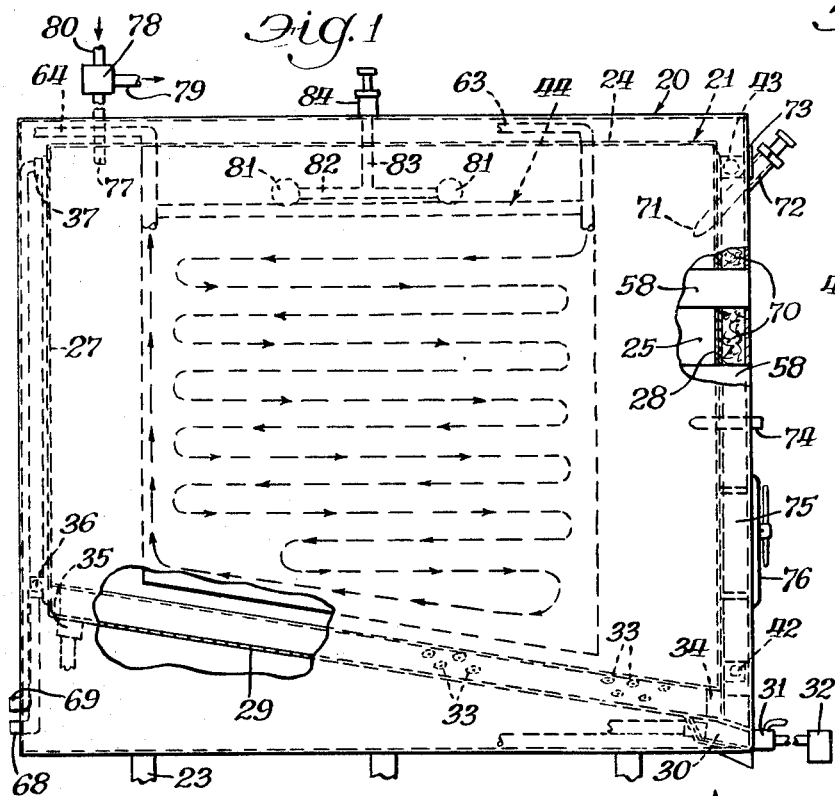
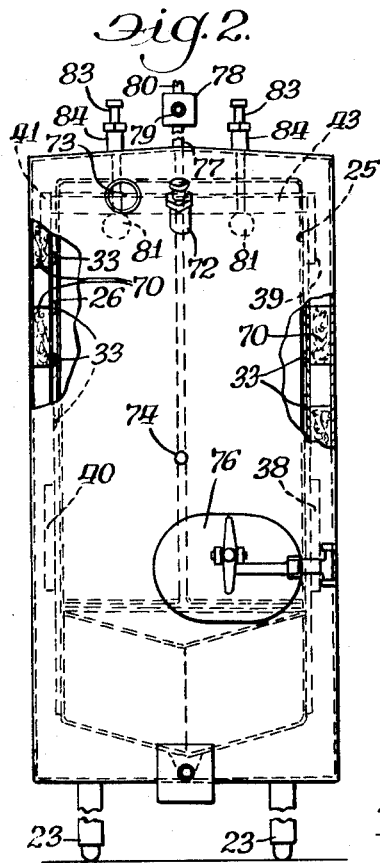
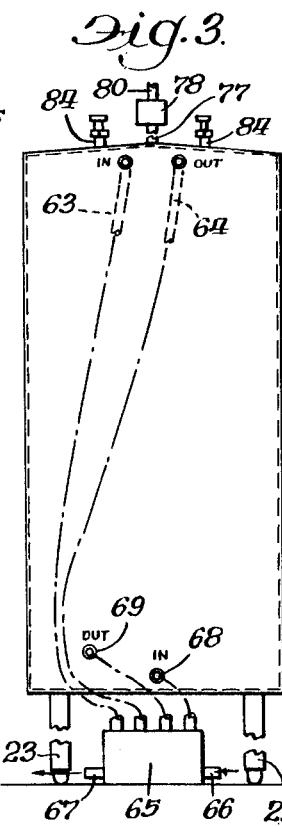
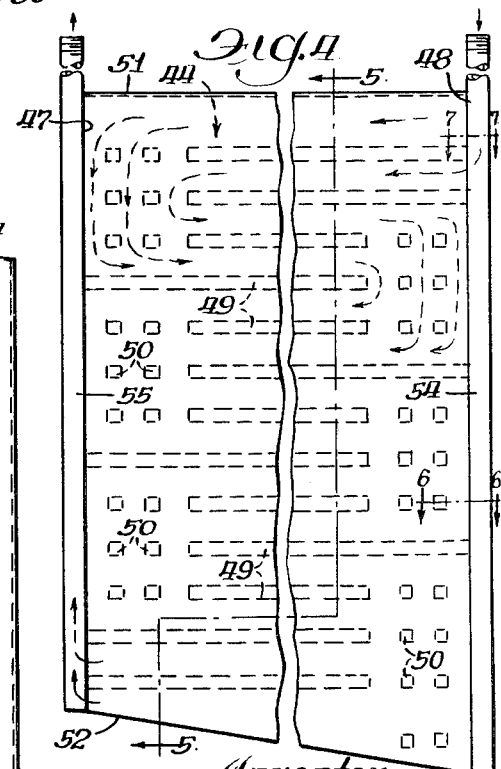
Inventor:
Norman J. Peters
By Norman E. H. Seletzke
Atty.

July 7, 1970   N. J. PETERS   3,518,759
ATTEMPERING AND FINISHING UNIT FOR CULTURED SOUR CREAM
Filed Oct. 1, 1965   2 Sheets-Sheet 2
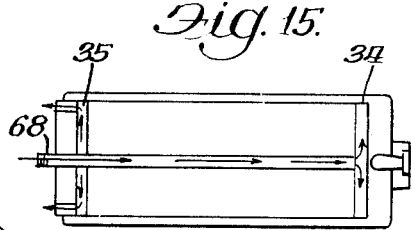
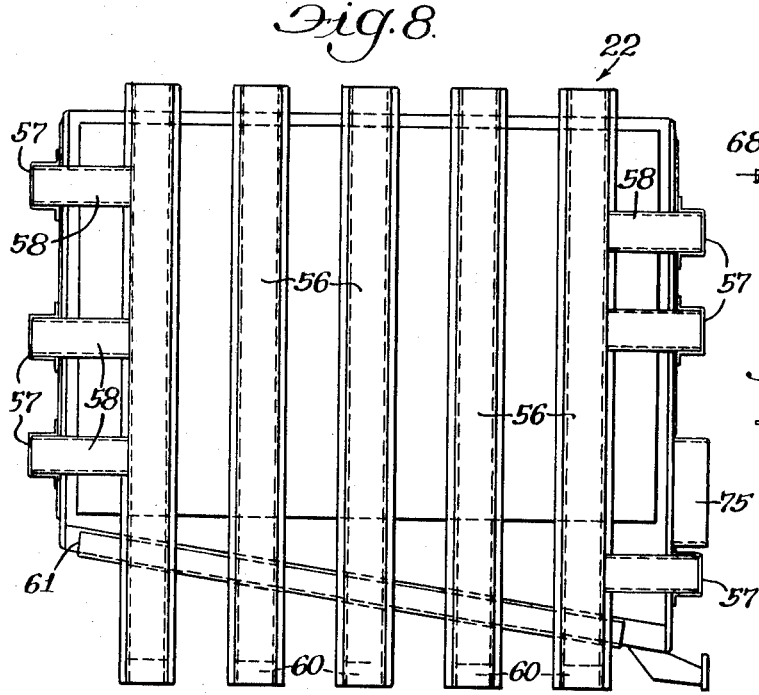
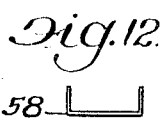
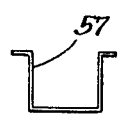
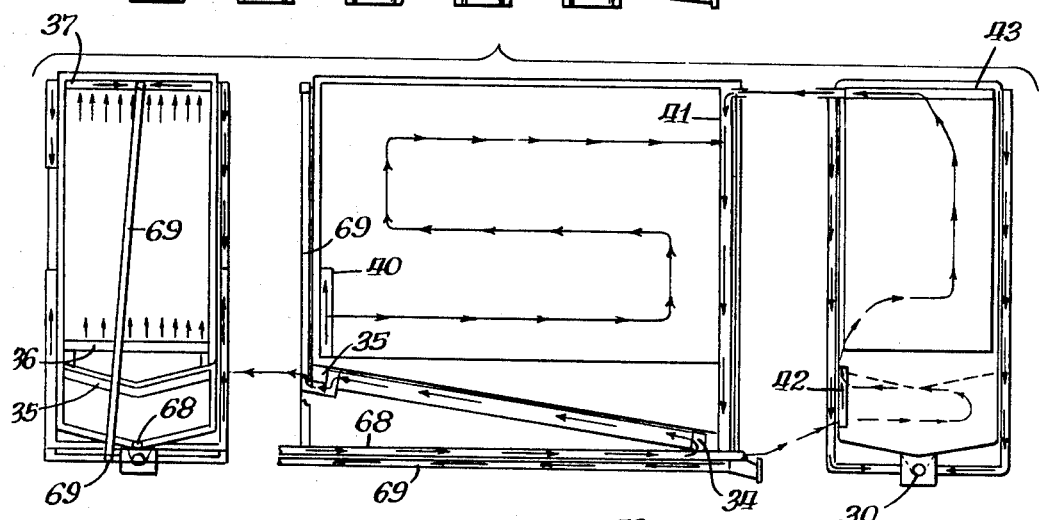
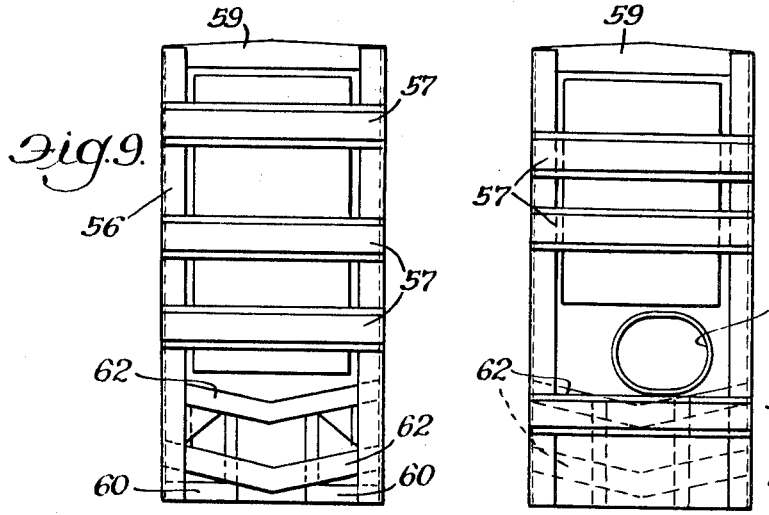
Inventor
Norman J. Peters United States Patent Office 3,518,759
Patented July 7, 1970

3,518,759
ATTEMPERING AND FINISHING UNIT FOR CULTURED SOUR CREAM
Norman J. Peters, Fond du Lac, Wis., assignor, by mesne assignments, to Dairy Equipment Company, Madison, Wis., a corporation of Wisconsin
Filed Oct. 1, 1965, Ser. No. 492,112
Int. Cl. A01j *13/00*
U.S. Cl. 31—2
18 Claims

ABSTRACT OF THE DISCLOSURE

An apparatus for processing cultured cream comprising a tank having two opposed side walls and two opposed end walls connected along their upper edges by a top wall and connected along their bottom edges by a bottom wall. Each wall is composed of a flat inner wall section and an outer wall section having a plurality of protuberances which are engaged with the outer surface of the inner wall section. The protuberances space the outer wall section from the inner wall section and provide passages for the circulation of an attempering medium. An attempering element composed of two spaced parallel sheets is located within the tank and spaced from the walls of the tank. The spaces between the sheets of the attempering element serve as passageways for the circulation of an attempering medium.

---

This invention pertains generally to improvements in a finishing unit for use in the manufacture of cultured sour cream, specifically a unit well adapted for the attempering of the cream being processed under predetermined conditions of pressure and temperature and quiescence.

Stated with more particularly, this invention relates to improvements in a device for the heating and/or cooling and holding, under conditions of controlled temperatures and pressures and quiescence, of a product, such as cultured sour cream, which during the processing thereof develops specific characteristics of relatively high viscosity and distinctive flavor, body and texture. This invention also relates to the effective operation of the processing device, from which device the finished product is discharged under pressure, ready for immediate packaging. This invention also relates to the improvements in the method of manufacturing the cultured sour cream.

Prior to this invention, the common practice, in the dairy industry, in the manufacture of cultured sour cream, was to suitably process the blend of cream and other ingredients, including the inoculation of the cream with the desired starter, to the stage of the treatment where the cream, which was being thus processed, must be cooled and held under relatively quiescent conditions to permit the incubation of the culture and the development of the desired characteristics of viscosity, body, flavor and texture, etc. Such cooling and quiescent resting has, in the past, been commonly accomplished promptly after the addition of the starter to the cream by the introduction of the thus inoculated cream into so-called milk cans of perhaps the ten gallon variety, and then placing the thus filled milk cans containing the cream and starter mixture into a cooler, where the cultured cream was permitted to cool and was then held for the desired length of time at such lowered incubation temperature until the desired characteristics of flavor, body, viscosity and texture had developed in the treated cream.

When such processing or incubation of the cream was completed, the viscous, cultured sour cream, was then promptly cooled to a packaging or storage temperature and if it was to be packaged it was then removed from the milk cans in which it had been processed and was introduced into a packaging device for immediate packaging.

Obviously, due to the high viscosity characteristics of the thus cultured sour cream, unduly large quantities of the product tended to adhere to the cold metal walls of the milk cans and, since the finished product could not be warmed prior to packaging without damaging the product and could also not be warmed until it was to be used without damaging the characteristics thereof, such manner of processing or manufacture of the product in small batches in individual milk cans proved to be wasteful of the product, especially so when relatively large quantities of the product, such as hundreds of gallons of the product, were to be manufactured.

The objectives of this invention therefore include the provision of an improved device, such as a sealed tank operable under controlled conditions of temperature and pressure, for the finishing steps in the processing or manufacture of cultured sour cream; wherein the interior of the device may be readily and quickly attempered to a desired temperature, including the temperature of the incoming product; wherein the product being processed may be held while in a quiescent state under desired and adjustable conditions of pressure and temperature for effective and efficient attempering and holding of the product without agitation and then unloaded or discharged as a finished product from the device under pressure, as for example, air pressure, for direct packaging; wherein the interior of the device is conveniently arranged for easy and thorough inspection from a single manhole and is provided with smooth interior surfaces to permit easy cleaning and easy removal of the product without wasting of product; wherein the device requires a minimum of floor space in proportion to its capacity, and eliminates the use of moving parts, such as agitators, impellers, etc.; and wherein the improved sanitary design enables the saving of operating labor, and reduces bacterial contamination of the product, and permits improved quality control of the product.

An improved device and method for the processing of cultured sour cream embodying the new, novel and useful features and aspects of this invention, whereby to attain the foregoing objectives, possesses the advantages of; simplicity of design including the smooth interior surfaces which may be easily cleaned and inspected for improved sanitary operation, and which permits the processing of the product without the handling thereof by the operators, thereby reducing the bacterial contamination and enabling improved quality control; minimum use of floor space in proportion to rated capacity; the elimination of moving parts; the efficient and effective attempering and processing of the product while it is being held in a quiescent state under regulated conditions of pressure and temperature; and the direct packaging of the finished product discharged under pressure from the improved processing device with a minimum of waste of the processed product.

The foregoing and other objectives, important new, novel and useful features and advantages of this invention will become more apparent and be more easily understood upon examination of the following description thereof and the accompanying drawings and appended claims. It should, however, be remembered that, without desire of limitation, the structural features of the invention will be described and illustrated as the preferred embodiment of the invention in a device particularly well adapted for the processing of cultured sour cream. Certain changes and variations in the invention may, upon review of this application, suggest themselves to those skilled in the pertinent arts, which changes may, however, not depart from the spirit of this invention and may come within the scope of the appended claims.

In the accompanying drawings:

FIG. 1 is a side elevational view, partially in broken away section, of the enclosed tank embodying this invention;

FIG. 2 is a front elevational view, partially in broken away section, of the enclosed tank shown in FIG. 1, of the drawings;

FIG. 3 is a rear elevational view of the improved tank shown in FIG. 1, of the drawings;

FIG. 4 is a side elevational view of the improved heat exchange element suspended centrally in the improved tank according to the embodiment of the invention shown in FIG. 1, of the drawings;

FIG. 5 is a vertical, sectional view taken along line 5—5 of FIG. 4, of the drawings;

FIG. 6 is a horizontal, sectional view taken along line 6—6 of FIG. 4, of the drawings;

FIG. 7 is a horizontal, sectional view taken along line 7—7 of FIG. 4, of the drawings;

FIG. 8 is a side elevational view of the skeleton-like framework supporting the inner tank liner and the tank jacket;

FIG. 9 is a rear elevational view of the framework shown in FIG. 8, of the drawings;

FIG. 10 is a front elevational view of the framework shown in FIG. 8, of the drawings;

FIGS. 11, 12 and 13 are transverse sectional views of structural members used in the formation of the framework shown in FIGS. 8, 9 and 10 of the drawings;

FIG. 14 is a composite, exploded, illustrative view of the attempering medium flow system in the side walls and the end walls of the improved tank shown in FIG. 1, of the drawings; and FIG. 15 is an illustrative view of the attempering medium flow system in the bottom wall of the improved tank.

Referring to the drawings, in which like elements are identified by like numerals, and referring in particular to FIG. 1, of the drawings, 20 represents a substantially rectangular enclosing jacket or shell for a sealable attempering tank 21 of the double-walled type operable under controlled pressure conditions. Jacket 20 encases a skeleton-like structural framework 22 upon which framework the jacket 20 is supported and to which framework jacket 20 is affixed, as by welding. Framework 22 encases the tank 21 which is fixed to the framework 22, as by welding, and the walls of the tank 21 are rigidly braced and supported by such framework. The entire assembly of the tank 21 and framework 22 and jacket 20 is supported upon adjustable supports 23 rigidly fixed to the lower portion of the framework 22 and extending downwardly therefrom.

The inner tank 21 has a substantially horizontal and substantially rectangular top wall 24, two opposed and parallel and vertically disposed and substantially rectangular and elongated and hollow pressure-type side walls 25 and 26, two opposed and parallel and vertically disposed and relatively narrow and hollow pressure-type end walls 27 and 28, and a substantially rectangular and elongated and hollow pressure-type bottom wall 29. Bottom wall 29 is pitched downwardly toward its front end and is trough-shaped in transverse section.

The outer edges of the top wall 24 are permanently sealed and fixed to the corresponding top edges of the side walls 25 and 26 and top edges of the end walls 27 and 28, and the outer edges of the bottom wall 29 are permanently sealed and fixed to the corresponding lower edges of the side walls 25 and 26 and lower edges of the end walls 27 and 28. A sunken outlet pod 30 is provided at the juncture of the lowermost forward portion of the trough-shaped bottom wall 29 and the front wall 28 and terminates at the outlet valve 31, for establishing controlled communication between the interior of the tank 21 and a packaging device 32, by way of the valve 31.

Each of the pressure walls 25, 26, 27, 28 and 29 is formed of an inner sheet of material, such as stainless steel, which is flat and smoothly finished to a high polish on its inner face so that the interior of the tank 21 is smooth, and may be easily cleaned and the product not tend to stick to the walls, and an outer sheet, the edges of which are sealed, as by welding, to the corresponding edges of the inner sheet, and which outer sheet is spaced from the inner sheet by a multiplicity of inwardly directed and rounded protuberances 33, formed in the outer sheet of material of each of such pressure walls. The protuberances 33 engage the outer face of the inner sheet of the mentioned pressure walls. Each such protuberance 33 is securely fixed, as by welding, to the associated inner sheet, and the multiplicity of protuberances are spaced to function as structural spacers and bracing members to produce rigid hollow walls 25 to 29 inclusive and to also function as dispersing and distributing elements for the heat exchange medium when it is caused to flow through between the thus joined sheets of those walls when the device is used as a heat exchange apparatus and the walls are attempered by the heat exchange medium.

Each of the side walls 25 and 26 and the front wall 28 is provided with horizontally disposed baffle elements (not shown) whereby to cause the zig-zag flow of attempering medium flowing through the fluid flow spaces between the inner and outer sheets of those pressure walls. The bottom wall 29 is provided at its front edge and at its rear edge with transversely extending fluid headers 34 and 35 respectively, which communicate with the fluid flow space within the hollow bottom wall 29. Similiarly, the rear wall 27 is provided at its lower and upper ends with transversely extending fluid headers 36 and 37 respectively. Side wall 25 is provided at its lower rear corner and at its upper front corner with fluid flow headers 38 and 39 respectively, and side wall 26 is similarly provided with headers 40 and 41 respectively. Front wall 28 is provided at its lower corner adjacent side wall 26 with a vertical header 42 and is provided along its top edge with a horizontal header 43. As hereinafter described in more detail, the various headers are so connected to the flow spaces in the various walls 25 to 29 and to supply and discharge connections and to suitable flow control means so that the desired direction of flow of attempering medium through the hollow walls 25 to 29 may be established and maintained, whereby to secure the desired attempering of the product in tank 21, and whereby to secure the desired temperature differentials between the product and the attempering medium at various elevations of the attempering walls 25 to 29.

To increase the heat exchange capacity of the unit and to enable the satisfactory and expeditious attempering of a column of product while it is being held quiescently in the tank 21, there is provided a substantially rectangular, flat and longitudinally elongated but narrow and vertically disposed attempering element 44. Element 44 is suspended from the top wall 24 of tank 21 and is positioned midway between the side walls 25 and 26 with the flat and parallel side surfaces 45 and 46 thereof positioned parallel respectively to the side walls 25 and 26 of the tank 21, and the rear and front vertical edges 47 and 48 of element 44 spaced from and parallel respectively to the rear and front walls 27 and 28 of the tank 21.

As shown in FIGS. 4, 5, 6 and 7 of the drawings, the attempering element 44 is comprised of two opposed, flat and parallel and highly polished sheets of material 45 and 46, such as sheets of stainless steel which are spaced one from another and affixed, as by welding, to baffle and bracing elements 49 and spacer elements 50. Excepting for the attempering medium inlet opening at the upper right hand corner of the element 44, as shown in FIG. 4, and as identified by the fluid flow direction arrows, and the attempering medium outlet connection at the lower left hand corner of the element 44, as also indicated by the fluid flow direction arrows, the side edges 47 and 48 and top and bottom edges 51 and 52 respectively of the flat sheets 45 and 46 are sealed one to another by a closing strip 53, sealed and permanently fixed to the edges 45 and 46, as by welding.

As shown, the supply header 54 for the element 44 communicates with the fluid flow space between the surface plates 45 and 46 only at the upper left hand portion of the element 44, at which location the edge closing strip 53 has been omitted down to the second baffle 49 from the top of the element 44. Similarly, the discharge header 55, for the element 44, communicates with the fluid flow space within the element 44 only at the lower left hand corner of that element, where again the closing strip 53 has been omitted up to the second baffle 49 from the bottom edge of 44.

The headers 54 and 55 also function as vertical braces for the element 44 and also function as supports or hangers for that element. The upper ends of the headers 54 and 55 extend through the top wall 24 of the tank 21, and are suitably sealed to that top wall 24 and are secured to and supported on the framework of the unit in a conventional manner (not shown).

In the improved apparatus of the type illustrated in the drawings, which apparatus may be of the 1000 gallon rated capacity type, it becomes necessary to provide suitable supports and braces for the relatively thin-walled inner tank 21. As shown in the drawings, FIGS. 8, 9, 10, 11, 12 and 13, the tank 21 is encased in a skeleton-like framework 22 consisting of the spaced and parallel vertical risers 56 which bracingly and supportingly engage and are welded to the side walls 25 and 26 of tank 21, spaced and parallel, horizontal supports and braces 57 which are welded to the rear and front walls 27 and 28, and thus bracingly and supportingly engage these walls, and are in turn structurally fixed to the adjacent vertical risers 56 by connecting structural braces 58, and the spaced and parallel horizontal bracing and support elements 59 supportingly fixed, as by welding, to the top wall 24 of the tank 21, and the horizontal brace and support elements 60, and the pitching brace and support element 61 and the V-shaped support element 62, all underlying the pitched and trough-shaped bottom lower wall 29 of tank 21. The bracing and support elements 56 to 60 inclusive are all secured and fixedly joined one to another, as by welding, to form a rigid bracing and supporting skeleton-like framework 22 for the inner tank 21, whereby to enable the tank to be operated as desired under conditions of positive or negative pressures within the tank.

The attempering medium is supplied to the element 44 by way of the inlet pipe 63 communicating with the supply header 54 and is in turn discharged from the element 44 by way of the discharge header 55 through the discharge pipe 64. Pipes 63 and 64 communicate with the attempering medium control and supply and discharge unit 65 to which the attempering medium is supplied by pipe 66 and is discharged by way of pipe 67.

As illustrated in FIGS. 14 and 15, of the drawings, the attempering medium is supplied through pipe 68 and suitable branch connections to the lower front end header 34 of the bottom wall 29 and passes upwardly and rearwardly through the hollow bottom wall 29 to the discharge header 35, from which header it is in turn discharged through suitable branch connections to the discharge pipe 69. The same branch pipes which supplied the attempering medium to the header 34 also supply the lower header 42 for the front wall 28 through which front wall the attempering medium flows in a zig-zag manner upwardly to the discharge header 43. Branch supply pipes extend from supply pipe 68 to the inlet headers 36, 38 and 40 for the hollow walls 27, 25 and 26 respectively, for supplying the attempering medium thereto. The used attempering medium is in turn discharged from these hollow walls 27, 25 and 26 through the associated discharge headers 37, 39 and 41 respectively, and is carried through suitable branch pipes to the discharge pipe 69. The attempering medium supply pipe 68 and discharge pipe 69 in turn communicate respectively with the supply pipe 66 and the discharge pipe 67 through the control unit 65. The control unit 65 may be so adjusted that the direction of the flow of the attempering medium through the hollow walls is reversed by reversing the flow through the supply and discharge pipes 68 and 69. The suitable adjustment of the control unit 65 will effect a similar change in the direction of flow of the attempering medium through the element 44. By virtue of such possible adjustment of the direction of the flow of the heat exchange medium through the hollow walls 25 to 29 and the element 44 it is possible to regulate the relative temperatures within the upper and the lower portions of the interior of the tank 21.

The outer shell or jacket 20 is fixed to and supported upon the outside of the skeleton-like framework 22 and the tank 21 is supported and rigidly braced within the same framework 22. Suitable insulation 70 is provided intermediate the tank 21 and the jacket 20 to satisfactorily insulate the tank 21.

A no-foam type product inlet connection 71 is provided in the upper portion of the front wall 28 and extends into the tank 21 through a sanitary fitting 72 fitted into jacket 20 and the front tank wall 28. Connection 71 may be removed if desired during the processing of the product to enable use of the fitting 72 as a product sampling opening. Fitting 72 may be sealed by the use of a conventional sanitary fitting cap (not shown) when it is desired to seal the interior of the tank 21.

An inspection glass 73 is also provided in the upper portion of the front wall 28, whereby to enable the inspection of the product during the processing thereof. The temperature of the product being processed may be determined by the use of a conventional thermal unit in the thermometer well 74 in the front wall 28 of tank 21. The single manhole 75 and manhole cover 76 is provided in the lower portion of the front wall 28 to permit the inspection of the entire interior of the tank 21 when the apparatus is not in use. Manhole 75 is of such size and is so positioned that a workman may enter the tank 21 therethrough and inspect the interior of the tank or make necessary repairs or do necessary cleaning.

During the filling of the tank 21, air may be permitted to escape through the air outlet and intake connection 77 through which the air is permitted to flow under controlled conditions by the air supply and discharge control means 78. Air is discharged from the control means 78 through connection 79 and may be supplied under desired pressure from a source of supply through connection 80. Air under pressure may thus be supplied to the top of the interior tank 21 from unit 78 through pipe 77.

To facilitate the cleaning or washing of the interior of the tank, there are provided two sets of wash solution or cleaning solution spray balls 81, mounted on horizontal wash solution supply pipes 82 on either side of the top edge of the heat exchange element 44 at the central top portion of the tank 21. Pipes 82 are each provided at the mid section thereof with a vertical support and wash solution supply riser 83 communicating with the associated pipe 82 and extending vertically through the top wall 24 of tank 21 and through the jacket 20 through sanitary fittings 84 which support the risers 83 and seal the passage or opening through the tank 21.

The general relative dimensions of the improved apparatus are such that for a machine having a rated capacity of 1000 gallons, the interior of the tank 21 has a length of approximately eight feet and an average height of approximately six feet and a width of approximately three feet. Due to the pitch of the bottom wall 29, the maximum height of the tank 21 for the stated capacity is approximately six and one-half feet. Based upon experience, it has been determined that the maximum relative dimensions of the height and the thickness of a column of the cultured sour cream in that portion of the tank 21, between the element 44 and either of the side walls 25 or 26, would be a height of 80 inches and a thickness of 18 inches, with the limits of height varying between 80 inches and 96 inches and the limits of the corresponding thickness vaying between 14 inches and 20 inches.

In the operation of the device and in the manufacture and direct packaging of cultured sour cream according to the subject invention, the cream which has been standardized to milk fat content of approximately 18 to 20 percent, and to which a small quantity of high quality low heat nonfat dry milk solids may have been added, is pasteurized at a temperature of 165 degrees Fahrenheit for 30 minutes or at a temperature of 180 to 185 degrees Fahrenheit for 16 seconds, and is then immediately homogenized at a pressure of 1500 to 2500 degrees per square inch. The pasteurized and homogenized cream is then immediately cooled to a temperature of approximately 71 to 72 degrees Fahrenheit, at which temperature it is introduced into the improved tank 21 through the no-foam inlet 71 after the air control unit 78 has been adjusted to permit the escape of air from the interior of the tank 21, and the attempering walls 25 to 29 and the attempering element 44 have all been attempered to a temperature of approximately 71 degrees Fahrendeit. Simultaneously, with the introduction of the cooled homogenized cream into the tank 21, a suitable active starter material in an amount equal to 2 to 5 percent of the quantity of cream being introduced into the tank 21 is blended with the incoming cream. The thus inoculated cream and the starter mixture is then permitted to incubate in the tank 21 at a temperature of approximtaely 71 to 72 degrees Fahrenheit while the cream is quiescently held in the tank under normal room pressures or under reduced pressure or vacuum by suitable adjustment of control 78 until an acidity of .65 to .70 percent is developed in the inoculated cream. As soon as the desired acidity is thus developed in the cream, the attempering walls 25 to 29 and the attempering element 44 are further cooled by the circulation of cooling attempering medium therethrough, whereby to promptly cool the quiescently held cultured cream to a temperature of approximately 40 degrees Fahrenheit. When the cultured sour cream has been thus cooled to such desired temperature the cultured cream may be readily discharged from tank 21 by suitably adjusting the air control unit 78 and introducing air under pressure into the upper portion of the tank 21 (after the other openings in the tank 21, such as the no-foam inlet opening 72, have also been sealed) and opening the discharge valve 31 for discharging the cooled and finished cultured cream directly into a packaging device 32, for immediate packaging.

Although the invention has been particularly described as embodied in a device for the processing of cultured sour cream, it may obviously be embodied in variations of similar devices for the processing of similar products without departing from the hereinbefore expressed limitations.

From the foregoing description of this invention and from the accompanying drawings, it will be apparent that this invention realizes the introductorily enumerated objectives respecting the improved processing device for cultured sour cream. It will similarly be apparent that the invention also possesses the hereinbefore listed advantages and provides new, novel and useful improvements in a device for the processing of cream.

Having thus described and illustrated the preferred embodiments of this invention, the invention is not to be interpreted as being restricted to the specifically illustrated and described embodiments, as set forth in the drawings and as hereinbefore described, except insofar as is necessitated by the appended claims and the disclosures of the prior art.

The invention is hereby claimed as follows:

1. Apparatus for processing material to produce a product of substantial viscosity, comprising, in combination;
    (a) a substantially rectangular tank having two opposed and substantially flat and attemperable and relatively long side walls and two opposed and substantially flat and attemperable and relatively short end walls;
    (b) and attempering means having two oppositely facing side surfaces disposed substantially parallel to said side walls of said tank;
    (c) the relative dimensions between the heights of the space to be occupied by a column of product within said tank intermediate one of said side walls and the adjacent side surface of said attempering means and the thickness of that space when measured from said attempering means outwardly to that same side wall preferably being of a ratio of approximately 80 inches to 18 inches with the limits of approximately 80 inches to 96 inches for the height of said column and corresponding limits of approximately 14 inches to 20 inches for the thickness of said column.

2. Apparatus according to claim 1,
    (a) having a substantially rectangular and attemperable bottom wall which has a longitudinal dimension which is relatively large as compared to its transverse dimension and which bottom wall is sealingly joined along its outer edges to the lower edges of said side walls and said end walls;
    (b) said bottom wall being trough-shaped in transverse section and having one of its ends lower than its opposite end;
    (c) and wherein said side walls and said end walls and said bottom wall all have inner surfaces which are smoothly polished.

3. Apparatus for processing cultured cream, comprising, in combination;
    (a) a longitudinally elongated and substantially rectangular and sealable processing tank having two opposed and longitudinally extending and vertically disposed and substantially flat attempering side walls and two opposed and transversely extending and substantially flat and vertically disposed attempering end walls;
    (b) and centrally positioned attempering means having two oppositely facing and longitudinally extending and vertically disposed side surfaces, positioned substantially parallel to said attempering side walls of said tank and positioned substantially midway between said side walls of said tank, and having two vertically disposed end surfaces joining said two side surfaces, and each said end surface being spaced respectively from the adjacent one of said end walls of said tank;
    (c) the vertical dimension or height of the space to be occupied by a column of product within said tank intermediate one of said side walls and said attempering means and the thickness of that space when measured from said attempering means outwardly to that same side wall preferably being of a ratio of approximately 80 inches to 18 inches with the limits of 80 inches to 96 inches for the vertical dimension or height and corresponding limits of 14 inches to 20 inches for the thickness.

4. Apparatus for processing cultured cream, comprising, in combination;
    (a) a longitudinally elongated and sealable processing tank having two opposed and longitudinally extending and vertically disposed attempering side walls and two opposed and transversely extending and vertically disposed attempering end walls;
    (b) and centrally positioned attempering means having two longitudinally extending and vertically disposed side surfaces disposed substantially parallel to said attempering side walls of said tank and positioned substantially midway between said side walls of said tank and having two vertically disposed end surfaces spaced respectively from the adjacent one of said end walls of said tank;
(c) the vertical dimensions of the space to be occupied by a column of product within said tank intermediate one of said side walls and said attempering means and the thickness of that space when measured from said attempering means to that same side wall preferably being of a ratio of approximately 80 inches to 18 inches with the limits of 80 inches to 96 inches for the height and the corresponding limits of 14 inches to 20 inches for the thickness.

5. Apparatus for processing cultured cream, comprising, in combination;
(a) a substantially rectangular tank having two opposed and substantially flat side walls and two opposed and substantially flat end walls;
(b) and attempering means having two oppositely facing side surfaces disposed substantially parallel to said side walls of said tank and positioned substantially midway between said side walls of said tank and having two end surfaces joining said two side surfaces and each such end surface being spaced respectively from the adjacent one of said end walls of said tank;
(c) the height of the space to be occupied by a column of product within said tank intermediate one of said side walls and said attempering means and the thickness of that space when measured from said attempering means outwardly to that same side wall preferably being of a ratio of approximately 80 inches to 18 inches with the limits of 80 inches to 96 inches for the height and corresponding limits of 14 inches to 20 inches for the thickness.

6. Apparatus for processing cultured cream, comprising, in combination;
(a) a substantially rectangular and sealable tank adapted to be operable and to retain its dimensions under positive pressure and under negative pressure, and having two opposed and substantially flat side walls and two opposed and substantially flat end walls which are both substantially narrower than said side walls and having a substantially flat top wall and having a bottom wall the one end of which is lower than its opposite end;
(b) and attempering means having two oppositely facing side surfaces disposed substantially parallel to said side walls of said tank and positioned substantially midway between said side walls of said tank and having two end surfaces joining said two side surfaces and each such end surface being spaced respectively from the adjacent one of said end walls of said tank;
(c) the relative dimensions between the height of the space to be occupied by a column of product within said tank intermediate one of said side walls and said attempering means and the thickness of that space when measured from said attempering means outwardly to that same side wall preferably being of a ratio of approximately 80 inches to 18 inches with the limits of 80 inches to 96 inches for the height and corresponding limits of 14 inches to 20 inches for the thickness.

7. Apparatus for making cultured sour cream, comprising in combination;
(a) a relatively tall and substantially rectangular and substantially narrow and enclosed tank having side walls and end walls and a bottom wall and a top wall, for quiescently confining under regulated conditions of pressure and temperature, a batch of dairy product to be converted into cultured sour cream;
(b) said side walls and said end walls and said bottom wall all being adapted to be attempered under conditions of regulatable temperatures;
(c) means for regulating the pressure in the internal space intermediate the top wall of said tank and the upper surface of the product within said tank; and
(d) an elongated and substantially flat heat exchange element suspended from the top wall of said apparatus and disposed substantially midway between said side walls and spaced from said end walls and from said top wall and from said bottom wall;
(e) whereby to enable the processing of the product under the desired conditions of temperature and pressure and to enable discharging the processed product from the tank under selected pressure conditions.

8. Apparatus for making cultured sour cream, comprising, in combination;
(a) a tank having a bottom wall and two spaced and substantially flat and parallel side walls and two spaced and substantially flat and parallel end walls and a top wall forming an enclosed and sealable rectangular chamber which is relatively narrow compared to its height;
(b) said bottom wall being trough-shaped in its transverse cross-section and being pitched downwardly from one end thereof to the other end thereof where it is joined to the adjacent end wall;
(c) controllable discharge means at the lowermost end of said trough-shaped bottom wall;
(d) attempering medium confining means formed on the outer surfaces of and permanently fixed to said side walls and said end walls and said bottom wall, forming pressure walls for the controlled circulation through the thus formed flow spaces within said walls of heat exchange medium over said side walls and said end walls and said bottom walls;
(e) and pressure regulating means for controlling the flow of air into or out of said chamber and for regulating the pressure within said chamber.

9. Apparatus according to claim 8, having an elongated and substantially flat heat exchange element suspended from the top wall of said apparatus and disposed substantially midway between said side walls and spaced from said end walls and from said top wall and from said bottom wall.

10. An apparatus for processing material, comprising;
(a) a tank having an inner wall section with a smooth inner surface disposed in contact with the material to be processed and having an outer wall section located outwardly of the inner wall section;
(b) spacing means for spacing the outer wall section from the inner wall section to provide a passage therebetween;
(c) first circulating means for circulating an attempering medium within said passage;
(d) attempering means disposed within the tank and spaced from the inner wall section, said attempering means including an internal passageway for receiving an attempering medium; and
(e) second circulating means for circulating an attempering medium within said passageway.

11. An apparatus for processing material, comprising;
(a) a tank having two opposed parallel first walls and having two opposed parallel second walls, and a bottom wall connecting the bottom edges of said first and second walls;
(b) each of said walls comprising an inner wall section and an outer wall section, said inner wall section being substantially flat and said outer wall section being provided with a plurality of inwardly extending protuberances disposed in engagement with said inner wall section;
(c) said protuberances spacing said outer wall section from said inner wall section and providing a series of passages therebetween; and
(d) means for circulating an attempering medium within said passages.

12. An apparatus for use in the processing of cultured sour cream comprising, in combination;
   (a) a substantially rectangular tank having two opposed and substantially flat side walls and two opposed and substantially flat end walls, and a bottom wall which is trough shaped in transverse section and which has one of its ends lower than the opposite end and which is joined to the lower edges of said side walls and said end walls;
   (b) tempering means disposed within the tank and spaced inwardly from the side walls, the end walls and the bottom wall;
   (c) said attempering means comprising a pair of generally parallel sheets spaced apart to provide a passageway therebetween; and
   (d) means for circulating an attempering medium within said passageways.

13. Apparatus according to claim 12,
   (a) having a sealable discharge means communicating with the interior of said tank at the lowermost point of said bottom wall;
   (b) a top wall sealingly joined to the upper edges of said side walls and said end walls;
   (c) pressure control means for controlling the flow of air into or out of said tank and for controlling the pressure within said tank and communicating with the interior of said tank through the top wall thereof;
   (d) and a sealable material inlet in the front end wall of said tank near the upper end of said front end wall.

14. Apparatus according to claim 13, wherein said side walls and said end walls and said bottom wall are each formed of a plurality of joined sheets of material permanently secured together to form hollow pressure walls having attempering medium flow spaces intermediate said joined sheets for attempering such individual walls.

15. Apparatus according to claim 14,
   (a) wherein said tank is encased in a skeleton-like rigid structural framework supportingly engaging and permanently fixed to the outer sheets of material which form parts of the hollow pressure side walls and the end walls and the bottom wall of said tank, and also permanently secured to the top wall of said tank;
   (b) a jacket enclosing said framework;
   (c) and insulation material intermediate said jacket and said walls.

16. Apparatus according to claim 15, wherein said outer sheets which form parts of the said side walls and end walls of said tank and part of the bottom wall of said tank are provided with numerous protuberances directed toward and engaging the inner sheets of the walls of said tank and are permanently secured as by welding to such inner sheets at the point of engagement between each such protuberance and the adjacent inner sheet.

17. Apparatus according to claim 16, wherein said flow spaces in said side walls and in said end walls and in said bottom wall are all so connected to a controllable source of supply of attempering medium that the direction of flow of attempering medium through said flow spaces may be reversed when desired, whereby to enable the attaintment of the greatest temperature differential between the product and the attempering medium either at the top of the side walls and the top of the end walls or at the lower portions of such walls.

18. Apparatus according to claim 17,
   (a) having cleaning solution spraying devices suspended within said tank from the top wall thereof;
   (b) controllable means for supplying cleaning solution under controllable pressure to said spraying devices for washing the interior of said tank;
   (c) and a single manhole for the ready inspection of all of the interior of said tank.

References Cited

UNITED STATES PATENTS

| | | | |
|---|---|---|---|
| 2,746,847 | 5/1956 | Stahl | 31—89 |
| 2,875,590 | 3/1959 | Girton | 31—2 |

ROBERT W. JENKINS, Primary Examiner

UNITED STATES PATENT OFFICE
CERTIFICATE OF CORRECTION

Patent No. 3,518,759　　　　　　　　Dated　July 7, 1970

Inventor(s)　　Norman J. Peters

It is certified that error appears in the above-identified patent and that said Letters Patent are hereby corrected as shown below:

Column 5, line 43, Cancel "pitching" and substitute therefor ---pitched---, Column 7, line 7, Cancel "vaying" and substitute therefor ---varying---

SIGNED AND SEALED
DEC 22 1970

(SEAL)
Attest:

Edward M. Fletcher, Jr.
Attesting Officer

WILLIAM E. SCHUYLER, JR.
Commissioner of Patents